PULSE CODE SIGNAL DISTORTION MONITOR

Filed July 20, 1965

INVENTOR

JAMES EDWARD BRITT

BY Strauch, Nolan, Neale, Nies & Bronaugh ATTORNEYS

United States Patent Office 3,421,021

Patented Jan. 7, 1969

3,421,021

PULSE CODE SIGNAL DISTORTION MONITOR

James Edward Britt, Annandale, Va., assignor to Pulse Communications, Inc., Alexandria, Va., a corporation of Virginia Filed July 20, 1965, Ser. No. 473,473
U.S. Cl. 307—234 9 Claims
Int. Cl. H03k 5/20

ABSTRACT OF THE DISCLOSURE

A binary pulse code signal distortion monitoring circuit which analyzes each unit length pulse of one binary state, but not necessarily the other, and which provides an indication, or alarm condition, if any unit length pulse is longer than or shorter than an ideal unit length pulse, plus or minus, respectively, of a pre-established tolerable distortion threshold.

Figures 1, 2:
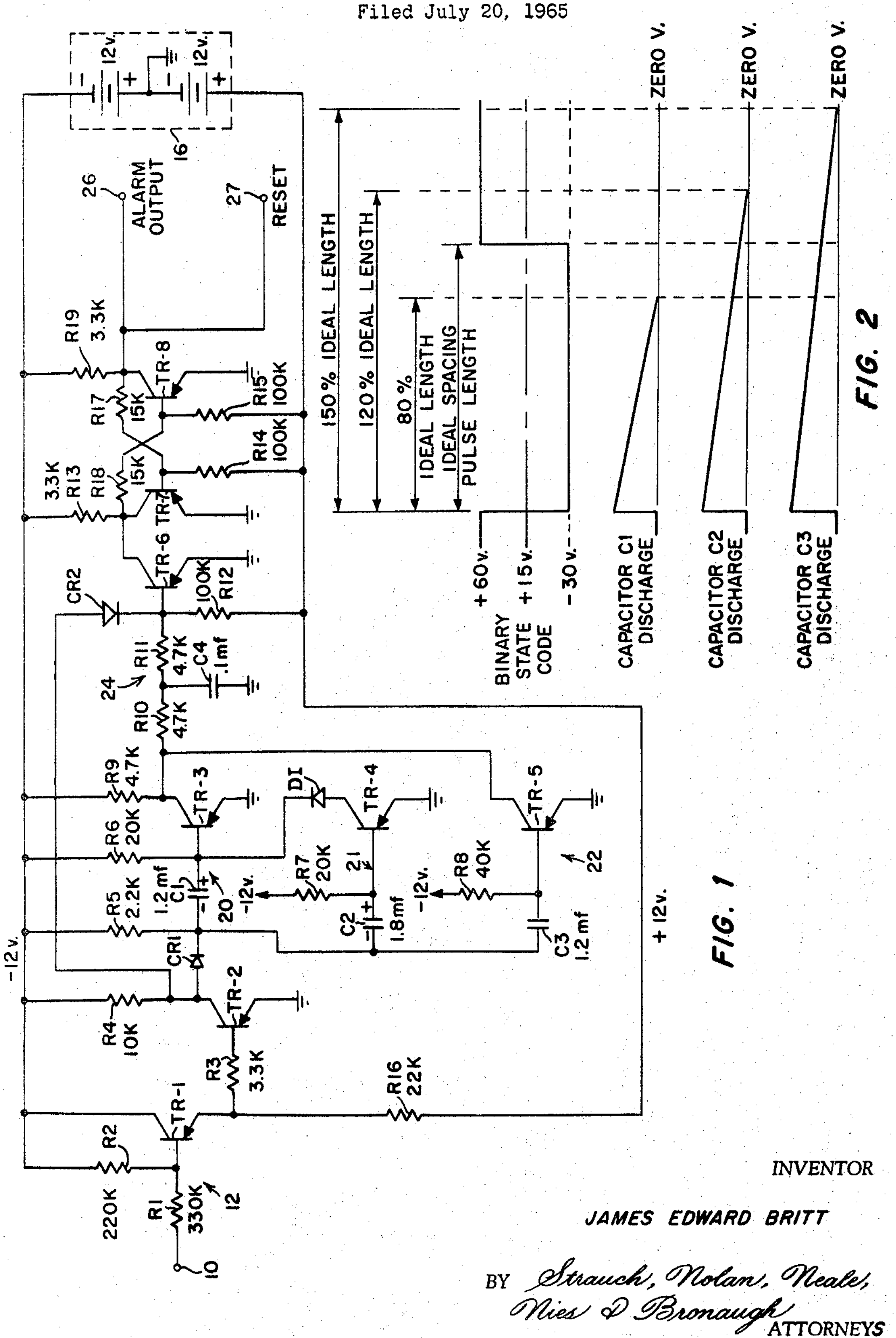

This invention relates to a method and apparatus for monitoring the distortion level of a train of impulses such as those used in teleprinter and other data signal transmission systems.

Distortion, as defined in the pulse code modulation field, is the displacement in time, from the ideal, of the transition point at which a binary signal shifts between its two states. Depending upon its cause, a distortion condition may affect all transitions, or all transitions in one direction only, or only transitions following a period without transitions, or only transitions at the start of a character group of impulses. Alternatively, the distortion effect may be entirely random or fortuitous.

Teleprinters and other receiving devices, as well as carrier equipments and other terminal gear, will tolerate distortion in the signals received only to a point. Even a single transition distortion more than the tolerable level may cause a group of coded impulses to be mistakenly interpreted as a different group, resulting in a mis-print or malfunction. Many distortion conditions are characterized by a gradual increase in distortion caused by slow degradation of sending equipment or transmission facilities. It is important, therefore, that personnel, automatic patching devices, or similar machines, be alerted to this signal degradation as soon as distortion begins to exceed a normal, acceptable amount so that undefective transmission facilities may be substituted for those in use and/or trouble analysis procedures may be instituted.

Heretofore, apparatus for monitoring the distortion of pulse code signals have been of two basic types: (1) devices utilizing oscillators to reference each signal transition with respect to a start pulse in the case of start-stop transmission, or, in the case of synchronous transmission, to reference each signal transition with respect to the modulation rate of the incoming signals as analyzed by special synchronizing circuits; and (2) so-called "shortest-pulse" devices, which are less complex than monitors using synchronizing circuits and/or oscillators and which detect distortion by determining whether unit length pulses of both of the two binary states are shorter than the ideal unit length pulse less a pre-established tolerable amount.

In contrast to the conventional forms of signal distortion monitors mentioned above, the present invention contemplates as one of its major objects a novel pulse code signal distortion monitoring apparatus and method wherein receiving pulses which are longer than, as well as shorter than, a tolerable, preset pulse length range are detected by checking only one of the two states of the binary code signals.

By detecting pulse lengths in a given binary state which are both shorter and longer than a preset distortion range, the method and apparatus of this invention offers the following advantages over the above-mentioned "shortest-pulse" monitors, while remaining essentially equivalent in size, complexity, and cost to the most efficient monitors of that class of device: (1) in monitoring five-level baudot code teleprinter signals, the monitoring circuit of the present invention will provide an alarm indication if excessive distortion of the type known as spacing bias exists on any one of twenty-three pulse-code character combinations, whereas conventional monitoring devices which cannot react to lengthening of unit element pulses will ignore excessive distortion of this type on all but sixteen character combinations; (2) lengthening only of the start pulse as a result of teleprinter clutch slippage, for example, is ignored by the conventional shortest-pulse devices mentioned above, but is detected by the monitoring apparatus of this invention; and (3) so-called positive characteristic distortion and certain fortuitous conditions causing only lengthening of unit length pulses are also ignored by the conventional shortest-length pulses mentioned above, but are always detected by the monitoring apparatus of this invention.

In addition to detecting the foregoing conditions, the monitoring apparatus of this invention is capable of detecting other distortion conditions such as marking bias, negative characteristic distortion, and momentary hits and is appreciably less complicated and expensive to manufacture in comparison with conventional monitoring devices having synchronizing circuits and/or oscillators.

Accordingly, it is a further object of this invention to provide a novel pulse code signal distortion monitoring circuit which analyzes each unit length pulse of one binary state, but not necessarily the other, and which provides an indication, or alarm condition, if any unit length pulse is longer than or shorter than the ideal unit length pulse, plus or minus, respectively, a pre-established tolerable distortion threshold. The ideal unit length pulse is defined herein as the reciprocal of the transmission modulation rate.

Another object of this invention resides in the provision of a novel pulse code signal distortion monitoring circuit which may be easily arranged to monitor data signals at essentially any modulation rate in common usage.

Still a further object of this invention is to provide a novel pulse code signal distortion monitoring circuit which is not disturbed by a shift from one pulse code format to another or a shift between start-stop and synchronous transmission.

Another object of this invention is to provide a novel pulse code signal distortion monitoring circuit which is essentially the same size and cost of previous monitoring circuits which do not analyze the lengthening as well as shortening of unit element pulses.

Further objects of this invention will appear from the appended claims and as the description proceeds in connection with the annexed claims wherein:

FIGURE 1 diagrammatically illustrates the circuit of this invention; and

FIGURE 2 is a graph illustrating the time relationship of the timing networks shown in FIGURE 1 with transmission signals to be monitored for explaining the operation of the circuit in FIGURE 1.

Referring now to the drawings and more particularly to FIGURE 1, the pulse code distortion monitor circuit of this invention is shown to comprise an input terminal 10 adapted to be connected to receive incoming signals from a transmission system. For the purpose of describing the invention, it will be assumed that the monitoring circuit input terminal 10 is connected to a conventional teleprinter circuit (not shown) in which, for example, the binary states are +60 volts for marking pulses and −30 volts for spacing pulses in a multi-unit impulse code as shown in FIGURE 2. Circuit values constituting one embodiment of this invention are illustrated in FIGURE 1. In the following detailed description, the components forming the monitoring circuit of this invention will be described generally in the order that they are encountered by the incoming signal.

With continued reference to FIGURE 1, the incoming signals coupled through terminal 10 are applied through a voltage divider network 12 to the base of a transistor TR1. Network 12 comprises a pair of resistors R1 and R2, of which resistor R1 is connected between terminal 10 and the base of transistor TR1. The base of transistor TR1 is connected through resistor R2 to a negative 12 volt side of a 24 volt D-C supply source 16 which advantageously may be a battery of suitable form.

As shown, the collector of transistor TR1 is connected to the negative 12 volt side of source 16, and the emitter of transistor TR1 is connected through a resistor R16 to the positive 12 volt side of source 16. Resistor R1 and transistor TR1 form an emitter follower which provides a high input impedance and low current drain on the teleprinter circuit to which it is connected in parallel.

With continued reference to FIGURE 1, the emitter of transistor TR1 is connected through a resistor R3 to the base of a transistor TR2. The emitter of transistor TR2 is connected to ground, and the collector of transistor TR2 is connected through a resistor R4 to the negative 12 volt side of source 16.

When the teleprinter circuit is in a steady marking condition, a positive potential of 60 volts is applied to input terminal 10 and fed through voltage divider network 12. Network 12 in dividing the positive 60 volt mark signal applies a positive signal voltage of sufficient magnitude to the base of transistor TR1 to render transistor TR1 non-conducting. When transistor TR1 is off, the positive voltage at its emitter is applied to the base of transistor TR2 to hold transistor TR2 in a non-conducting state.

As the incoming teleprinter signal fed through input terminal 10 shifts states from marking to spacing, the voltage level swings from a positive 60 volts to a negative 30 volts. By properly selecting the value of resistor R2, the bias applied to the base of transistor TR1 is such that transistor TR1 begins to conduct as the voltage shift approximately passes a positive 15 volt potential which constitutes the half-wave point where carrier equipment and receiver gear normally operate and, consequently, where it is desired to monitor the incoming signals.

When transistor TR1 starts to conduct, the biasing voltage on the base of transistor TR2 will drop with the result that transistor TR2 will start to conduct. As the voltage shift continues to go negative, more signal voltage from the negative side of source 16 is applied to the base of transistor TR2 such that transistor TR2 will be fully conducting when the shift of the incoming teleprinter signal reaches about +10 volts.

Transistor TR2 constitutes a D-C amplifier which, when conducting, drives a mark timing circuit 20, a space timing circuit 21, and a 150 percent or 1.5 unit pulse timing circuit 22. The mark timing circuit 20 and the space timing circuit 21, as will be described in detail shortly, respectively establish the short and long limits of a unit spacing pulse length range containing the ideal unit spacing pulse length and short and long tolerable amounts of pulse length distortion. Circuit 22 is employed to prevent the occurrence of a false alarm condition in the event two or more successive spacing pulses are transmitted as will become apparent as the description proceeds.

With continuing reference to FIGURE 1, timing circuit 20 contains a capacitor C1, a resistor R6, and a transistor TR3. Similarly, timing circuit 21 contains a capacitor C2, a resistor R7, and a transistor TR4. Timing circuit 22 likewise contains a capacitor C3, a resistor R8, and a transistor TR5.

The base and collector of transistor TR3 are respectively connected through resistors R6 and R9 to the negative 12 volt side of source 16. The base of transistor TR4 is connected through a resistor R7 to the negative 12 volt side of source 16. The collector of transistor TR4 is serially connected through an isolating diode D1 and resistor R6 to the negative 12 volt side of source 16. The base and collector of transistor TR5 are respectively connected through resistors R8 and R9 to the negative 12 volt side of source 16. The emitters of transistors TR3, TR4, and TR5 are respectively connected directly to ground which constitutes a reference potential. Transistors TR3, TR4, and TR5 are turned off when positive voltages are applied to their bases by discharging capacitors C1, C2, and C3 respectively.

The charging and discharging cycles of capacitors C1, C2, and C3 are controlled by transistor TR2. When transistor TR2 goes non-conducting and transistors TR4 and TR5 go conducting as a result of the return of the incoming, monitored signal to its mark condition, capacitors C1 and C2 are charged through resistor R5 and transistor TR4, and capacitor C3 is charged through resistor R5 and transistor TR5. As a result, the terminals of capacitors C1, C2, and C3 connected respectively to the bases of transistors TR3, TR4, and TR5 acquire positive charges and the terminals of capacitors C1, C2, and C3 connected to resistor R5 acquire negative charges. It is clear, therefore, that transistor TR2 resets timing circuits 20, 21, and 22 when the incoming, monitored signal returns to its mark condition.

When transistor TR1 is made to conduct as a result of a mark-to-space transition, transistor TR2 goes conducting to connect the negatively charged terminals of capacitors C1, C2, and C3 to ground. Capacitors C1, C2, and C3 consequently begin to discharge respectively through resistors R6, R7, and R8 upon the transition of the incoming signal to a spacing condition as shown in FIGURE 2. The discharge rates of capacitors C1 C2, and C3 are respectively set by resistors R6, R7, and R8 which advantageously may be potentiometers for adjusting the acceptable unit pulse length range in accordance with the ideal length of the unit spacing pulse (modulation rate) of the signals being monitored. Diode D1 prevents the discharging current of capacitor C1 from objectionably breaking down the junction of transistor TR4 and sets the capacitor discharge path so that the RC constant of capacitor C1 is determined by resistor R6.

As shown in FIGURE 2, the time constant of the mark timing circuit 20 is calibrated to equal the ideal unit spacing pulse length less a tolerable amount of distortion. The time constant of space timing circuit 21 is calibrated to equal the ideal unit spacing pulse length plus a tolerable amount of distortion.

As shown in FIGURE 1, a capacitor C4 having one plate connected to ground is charged from the negative 12 volt side of source 16 through resistors R9 and R10. When transistor TR3 is conducting, a circuit is completed for discharging capacitor C4 through resistor R10 and through the emitter and collector of transistor TR3 to ground. The terminal of capacitor C4 which is negatively charged through resistors R9 and R10 is coupled through a voltage divider network 24 to the base of a transistor TR6. When the incoming unit spacing pulse applied at terminal 10 is shorter or longer than the acceptable unit pulse range, a biasing voltage is applied to the base of transistor TR6 to cause transistor TR6 to conduct in a manner to be described in detail later on. When transistor TR6 is conducting, its collector-emitter current provides an alarm or indicating signal.

Network 24 is formed by resistors R11 and R12 having a common terminal connected to the base of transistor TR6. The other terminal of resistor R12 is connected to the positive 12 volt side of source 16. Resistors R10 and R11 are connected in series between the base of transistor TR6 and the collector of transistor TR3. By charging capacitor C4 a pulse signal or, in other words, a control signal is made available for biasing transistor TR6 to its conducting state.

To control the operation of transistor TR6 during the charging period of capacitor C4, a diode CR2 has its anode connected to the collector of transistor TR2 and its cathode connected to the base of transistor TR6. When transistor TR2 is conducting, therefore, diode CR2 grounds the base of transistor TR6 through the collector-emitter of transistor TR2. As a result, a clamp is applied to hold transistor TR6 non-conducting as long as transistor TR2 is conducting. If transistor TR2 goes non-conducting to remove the grounding clamp from the base of transistor TR6 when capacitor C4 is charged, transistor TR6 is turned on the signify an alarm condition.

An isolating diode CR1 having its anode connected to the collector of transistor TR2 and its cathode to the negatively charged terminals of capacitors C1, C2, and C3, prevents loading of the collector of transistor TR2.

For explaining the operation of the circuitry thus far described, it will be assumed that the values of resistors R6, R7, and R8 are set to provide a tolerance threshold or range of ±20 percent of the ideal spacing unit pulse length. Thus, a spacing pulse having a length which is as much as 20 percent shorter or 20 percent longer than the ideal spacing pulse length will be monitored as being acceptable.

In the marking condition of the incoming monitored teleprinter signal approaching a mark-to-space transition, capacitors C1, C2, and C3 are charged and transistors TR1 is non-conducting to prevent transistor TR2 from conducting. Transistor TR4 is conducting to apply a grounding clamp to the base of transistor TR3 to prevent transistor TR3 from conducting. Transistor TR5 is also conducting to ground the collector of transistor TR3. This latter grounding clamp prevents a voltage signal from being transmitted through resistor R10 from the collector of transistor TR5 to turn on transistor TR6 during the marking condition of the incoming signal being monitored.

During this marking condition, diode CR2 is back biased to the negative potential level at the terminal connection of resistor R4 to the collector of transistor TR2 with the result that no clamp is applied to the base of transistor TR6 at this time. Transistor TR6, however, does not go conducting during this period since capacitor C4 is connected to its discharge circuit through resistor R10 and the collector-emitter of transistor TR5. Accordingly, transistor TR6 remains non-conducting throughout the marking condition of the incoming signal at terminal 10.

When a mark-to-space transition occurs, transistor TR1 goes conducting to turn on transistor TR2, thereby connecting capacitors C1, C2, and C3 to their discharge circuits as previously explained.. As a result, capacitors C1, C2, and C3 begin to discharge through resistors R6, R7, and R8 respectively upon transition to a spacing condition as shown in FIGURE 2. Discharging of capacitors C1, C2, and C3 applies positive voltages to the bases of transistors TR3, TR4, and TR5 with the result that transistors TR4 and TR5 will go to their non-conducting states and transistor TR3 will be kept from going to its conductive state.

With the capacitor discharge rates as set by resistors R6, R7, and R8, the time for discharging capacitor C1 to zero volts is equal to the time needed to transmit a pulse equal to 80 percent of the length of an ideal spacing pulse, the time for discharging capacitor C2 to zero volts is equal to the time needed to transmit a pulse having a length equal to 120 percent of the ideal spacing pulse length, and the time for discharging capacitor C3 to zero volts is equal to the time needed to transmit a pulse having a length approximately equal to 1.5 times the length of an ideal spacing pulse length.

While capacitors C1, C2, and C3 are connected to their respective discharge circuits and are discharging, transistors TR3, TR4, and TR5 are held non-conducting as previously mentioned. With transistors TR3 and TR5 turned off, capacitor C4 charges rapidly through resistors R9 and R10 and normally is fully charged by the time a space-to-mark transition occurs. At this time, the charge on capacitor C4 is not operative to turn on transistor TR6 to cause an alarm indication since transistor TR2 is still applying a grounding clamp to the base of transistor TR6 through diode CR2.

If the incominng, monitored teleprinter signal has a marking bias which is greater than 20 percent such as 30 percent, for example, an early space-to-mark transition occurs while capacitor Cl is still discharging and capacitor C4 is still charged. The transition to a marking pulse turns off transistor TR1 with the result that transistor TR2 goes non-conducting. When transistor TR2 goes non-conducting to remove the clamp on the base of transistor TR6 under these conditions, the charge on capacitor C4 makes transistor TR6 conduct. In addition, the discharge circuit connections of capacitors C1, C2, and C3 to ground are interrupted when transistor TR2 goes non-conducting. As a result, transistors TR4 and TR5 immediately begin to conduct and transistor TR3 is held non-conducting by the grounding clamp applied to its base by transistor TR4. When transistor TR 5 goes conducting, it completes a discharge circuit for capacitor C4, but having removed the grounding clamp from the base of transistor TR6, a sufficient amount of stored voltage on capacitor C4 remains for application to the base of transistor TR6 to cause transistor TR6 to conduct momentarilly.

The circuitry responding to the voltage signal produced by making transistor TR6 conduct may be of any suitable, conventional form such as, for example, a bi-stable or flip-flop circuit having a pair of transistors TR7 and TR8. The collector and emitter of transistor TR6 are respectively connected to the collector of transistor TR7 and to ground. The emitter and collector of transistor TR7 are respectively connected to ground and through a resistor R13 to the negative 12 volt side of source 16. The base of transistor TR7 is connected through a resistor R14 to the positive 12 volt side of source 16 and also through a resistor R17 to the collector of transistor TR8. The base of transistor TR8 is connected through a resistor R15 to the positive 12 volt side of source 16 and also through a resistor R18 to the collector of transistor TR7. The emitter of transistor TR8 is connected to ground. The collector of transistor TR8 is connected to an alarm terminal 26, a reset terminal 27, and through a resistor R19 to the negative 12 volt side of source 16.

When transistor TR6 conducts, transistors TR7 and TR8 are triggered in the usual manner to provide negative voltage at terminal 26 for operating any suitable, unshown indicating means such as, for example, lamps, relays, or other alarm indicators. A singlle excessively distorted transition of the mointored signal will cause transistors TR7 and TR8 to operate and remain operated until a resetting gorund is manually or automatically applied to terminal 27 to cause transistors TR7 and TR8 to flop back to non-alarm conditions where they remain until a further signal from transistor TR6 causes them to flip again.

When transistor TR4 goes conducting upon transition to a marking condition a back-bias clamp is re-applied to the base of transistor TR3 with the result that transistor TR3 is held non-conducting to allow capacitor C4 to be recharged in the next spacing condition.

If the unit spacing signal being monitored is sufficiently long that the space-to-mark transition occurs ofter capacitor C1 has discharged to zero volts, but before capacitor C2 has discharged to zero volts, transistor TR3 will start to conduct as capacitor C1 goes slightly negative. Transistors TR4 and TR5, at this stage, are still held non-conducting since capacitors C2 and C3 are still discharging. When transistor TR3 conducts, it discharges capacitor C4. Thus when the clamp applied by diode CR2 to the base of transistor TR6 is removed by the susequent space-to-mark transition of the monitored signal, no voltage remains stored on capacitor C4 to turn transistor TR6 on.

If the length of the incoming unit spacing signal has a spacing bias which is greater than 20 percent such as 30 percent, for example, a late space-to-mark transition occurs after capacitors C1 and C2 have been timed out. At this stage, capacitor C3 has a positive charge and is still discharging. When timing circuit 21 times out, transistor TR3 will conduct until timing circuit 21 times out to make transistor TR4 conduct. During the period in which transistor TR3 is conducting, capacitor C4 is discharging. When transistor TR4 begins to conduct, however, transistor TR3 is turned off with the result that capacitor C4 re-charges very rapidly.

The late space-to-mark transition occurs after capacitor C4 is charged by cutoff of transistor TR3 with the result that the potential of the negative voltage on capacitor C4 is sufficient to make transistor TR6 conduct when the grounding clamp applied to the base of transistor TR6 through diode CR2 is removed. When transistor TR6 conducts, transistors TR7 and TR8 are flipped to feed an alarm signal to terminal 26 as previously described.

From the foregoing description it is evident that a gate is effectively established for the period equal to the ideal unit spacing pulse length plus and minus the tolerable amount of distortion for which the monitoring circuit is calibrated. If the teleprinter signal goes back to a marking condition during this gate or blanking period, no alarm signal is produced. If, however, the space-to-mark transition occurs earlier or later than this gate period, producing an excessively shortened or an excessively lengthened space condition, transistor TR6 goes conducting to trigger the flip-flop circuit TR7, TR8, thereby feeding an alarm signal to terminal 26 for indicating the presence of distortion in excess of the pre-established tolerable distortion range. The time period for signalling the presence of late space-to-mark transitions starts when capacitor C2 discharges to zero volts to allow transistor TR4 to begin to conduct for turning off transistor TR3 and re-charging capacitor C4. This time period terminates when timing circuit 22 times out for a purpose now to be described in detail.

In signal codes of the type employed in teleprinter circuits and the like, it is normal for two or more spacing pulses to occur successively without any space-to-mark transition between them. Timing circuit 22, however, prevents the generation of a false alarm signal which would otherwise occur under this condition. To this end it will be recalled that the RC time constant for timing circuit 22 is calibrated at 1.5 times the ideal unit spacing pulse length for the modulation rate of the signal being monitored. During this period a transition to a marking condition with maximum expected spacing distortion will occur if the spacing signal is only of single pulse length. If the space-to-mark transition does not occur in this time, therefore, then a normal condition prevails where a second spacing pulse is being transmitted.

Before this second spacing pulse terminates in a space-to-mark transition, capacitor C3 discharges to zero volts, allowing transistor TR5 to conduct before the transition occurs. As a result, capacitor C4 discharges through the emitter of transmitter TR5 to dissipate its alarm indicating charge before a space-to-mark transition takes place following the transmission of two or more successive spacing pulses.

It is understood that the monitoring technique just described may be employed with various modifications to suit the characteristics of the signal to be monitored. Some examples of such modifications are: (1) a different input arrangement to permit the monitoring circuit to be connected in series with a current-operated teleprinter circuit; (2) different timing devices such as one-shot multivibrators substituted for one or more of the three timers described; (3) different input arrangements to cause the monitoring circuit to be responsive to excessively shortened or lengthened mark pulses rather than space pulses; (4) duplicate circuitry to cause the monitoring circuit to be responsive to both marks and spaces; and (5) alarm indicating arrangements which may include circuitry to register each excessive distortion indication and only permit an output alarm condition when the total number of distortion indications exceeds a pre-established number.

It will be appreciated that in addition to monitoring pulse length distortion the apparatus of this invention as described herein is equally capable of monitoring normal pulse length variations in coded signals.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A pulse length monitoring apparatus adapted to be connected to a circuit carrying binary state pulse code modulation signals for indicating pulse length variation, said monitoring apparatus comprising means responsive to a shift from one of the modulation signal binary states to the other of the modulation signal binary states for providing a control signal, timing means initiated by said shift (a) for removing said control signal for a pre-established time period starting a predetermined time duration after said shift occurs and (b) for restoring said control signal for a predetermined period following termination of said pre-established time period whenever said modulation signals are still in said other state at the termination of said time period, and means responsive to said control signal, when present upon a shift of said modulation signal back to said one state, for providing an indicating signal.

2. A monitoring apparatus for indicating pulse length variations in binary state pulse code modulation signals comprising first and second timing devices having pre-established timing periods, means responsive to a shift in said binary signals from a first binary state to a second binary state for starting said timing devices and to a shift from said second state to siad first stage for resetting said timing devices, said second timing device having a longer timing period than said first timing device, and means cooperating with said first and second timing devices and being responsive to a shift from said second state to said first state for producing an output signal except for the time occurring at least during the timing period of said second timing device following the termination of the timing period of said first timing device.

3. A pulse length monitoring apparatus adapted to be connected to a circuit carrying binary state pulse code modulation signals for indicating pulse length variations, said monitoring apparatus comprising first and second time period measuring means, means responsive to a shift in said binary signals from a first binary state to a second binary state for initiating operation of said first and second time period measuring means, said second time period measuring means being operative to time out a predetermined period after said first time period measuring means, means cooperating with said first and second time period measuring means for providing an output signal at least except for the period of said second time period measuring means following termination of the period of said first time period measuring means, means responsive to the presence of said control signal upon a shift in said binary signals from said second state to said first state for providing an output indication, and reset means responsive to said signals for restoring said first and second time period measuring means to their original condition when said binary signals are in said first state.

4. A monitoring apparatus adapted to be connected to a circuit carrying binary state pulse code modulation signals for indicating pulse length distortion, said monitoring apparatus comprising timing means responsive to a shift in said binary signals from a first binary state to a second binary state for providing first and second pre-established timing periods both starting upon said shift, the duration of said second time period being longer than that of said first period, resetting means responsive to a shift from said second state to said first state for restoring said timing means to its original condition, an electrical energy storing device, means cooperating with said timing means for providing said energy storing device with a charge during said first timing period, further means cooperating with said timing means for removing the charge on said energy storing device at least during the duration of said second time period following the termination of said first time period, and means responsive to the presence of a charge on said energy storing device only upon the shift in said binary signals from said second state to said first state for producing an indicating signal.

5. A monitoring apparatus adapted to be connected to a circuit carrying binary state pulse code modulation signals for indicating pulse length variations, said monitoring apparatus comprising first, second, and third time period measuring means each having pre-established timing periods, means responsive to a shift in said binary signals from a first binary state to a second binary state for simultaneously starting said first, second, and third time period measuring means and to a shift from said second state to said first state for resetting said first, second, and third time period measuring means, said second and third time period measuring means respectively having longer timing periods than said first and second time period measuring means, means cooperating with said first, second, and third time period measuring means for producing a control signal only during the timing period of said first time period measuring means and the timing period of said third time period measuring means following the termination of the timing period of said second time period measuring means, and means responsive to the presence of said control signal for providing an output signal only when said binary signals shift from said second state to said first state.

6. The monitoring apparatus defined in claim 5 wherein said first, second, and third time period measuring means respectively comprise first, second, and third timing devices formed independently of each other.

7. A monitoring apparatus adapted to be connected to a circuit carrying binary state pulse code modulation signals for indicating pulse length distortion, said monitoring apparatus comprising a current operated device having a pair of current carrying terminals and a control element for controlling the flow of current through said terminals, an energy storing capacitor, means connecting the terminals of said capacitor respectively to said control element and to a source of reference potential, means responsive to said binary signals for storing a charge on said capacitor for a first pre-established time period initiating with a shift of said signals from a first binary state to a second binary state, first timing means for removing said charge at the end of said period, second timing means, means responsive to said modulation signals in said other state and cooperating with said second timing means for recharging said capacitor following a pre-established blanking period after the first mentioned time period is terminated, means responsive to said binary signals to remove the charge on said capacitor when present at the time a shift from said second state to said first state occurs, and means responsive to said binary signals for connecting said control element to said reference potential upon the shift from said first state to said second state and for disconnecting said control element from said reference potential upon the shift from said second state to said first state, the charge when stored on said capacitor during said shift from said second state to said first state being operative to provide a biasing signal causing said device to conduct current between said terminals.

8. A pulse length monitoring apparatus adapted to be connected to a circuit carrying binary state pulse code modulation signals for indicating pulse length distortion, said monitoring apparatus comprising means responsive to a shift from one of the modulation signal binary states to the other of the modulation signal binary states for providing a control signal, first time period measuring means activated in response to said shift for removing said control signal a predetermined time period after said shift occurs when said modulation signals are still in said other state, second time period measuring means activated in response to said shift for restoring said control signal after a lapse of a predetermined time duration following termination of said time period whenever said modulation signals are still in said other state, third time period measuring means activated by said shift for removing said restored control signal predetermined time period after said shift occurs whenever said modulation signals are still in said other state, means responsive to said control signal when present only upon a shift in said modulation signals from said other state to said one state for providing an indicating signal, means responsive to the shift back to said one state for removing said control signal when present, and means responsive to said modulation signals for restoring said first, second, and third time period measuring means to their original conditions when said modulation signals are in said one state.

9. A pulse length monitoring apparatus adapted to be connected to a circuit carrying binary state pulse code modulation signals for indicating pulse length distortion, said monitoring apparatus comprising means providing a source of operating voltage, circuit means containing first, second, and third timing capacitors, first switching transistor means responsive to a shift from a predetermined one of the modulation signal binary states to the other of the modulation signal binary states for simultaneously connecting said first, second, and third timing capacitors to be charged from said source and to a shift from said other state to said one state for simultaneously initiating the discharge of the charges on said first, second, and third timing capacitors, said circuit means being operable to complete the discharging of the charge on said second and third timing capacitors predetermined time periods respectively after the charges on said first and second timing capacitors have discharged, an energy storing capacitor connected in said circuit means to be charged from said source, transistor means responsive to the discharging of said first, second and third timing capacitors for (a) maintaining a charge on said storing capacitor for the duration that said first timing capacitor is discharging.

(b) removing the charge on said energy storing capacitor for the duration that said second timing capacitor continues to discharge following the discharging period of said first timing capacitor, (c) re-charging said energy storing capacitor when the discharging period of said second timing capacitor is completed, and (d) removing the charge on said energy storing capacitor when the discharging period of said third timing capacitor is completed, and means responsive to the presence of a charge on said energy storing capacitor only upon a shift from said one state to said other state for emitting an indicating signal.

References Cited

UNITED STATES PATENTS

| | | | |
|---|---|---|---|
| 3,204,189 | 8/1965 | Trautwein | 307—88.5 XR |
| 3,263,096 | 7/1966 | Willard | 307—88.5 |
| 3,317,668 | 5/1967 | Johnsen | 307—88.5 XR |
| 3,324,244 | 6/1967 | Britt et al. | 178—69 |

ARTHUR GAUSS, *Primary Examiner.*

J. ZAZWORSKY, *Assistant Examiner.*

U.S. Cl. X.R.

307—293; 328—112, 162; 178—69; 340—167